United States Patent
Lowe

(10) Patent No.: US 9,706,720 B1
(45) Date of Patent: Jul. 18, 2017

(54) INDOOR-OUTDOOR GARDEN UNIT

(71) Applicant: Benjamin Lowe, Fairview, UT (US)

(72) Inventor: Benjamin Lowe, Fairview, UT (US)

( * ) Notice: Subject to any disclaimer, the term of this patent is extended or adjusted under 35 U.S.C. 154(b) by 84 days.

(21) Appl. No.: 14/919,249

(22) Filed: Oct. 21, 2015

(51) Int. Cl.
  *A01G 9/00* (2006.01)
  *A01G 9/24* (2006.01)
  *A01G 9/02* (2006.01)

(52) U.S. Cl.
  CPC .............. *A01G 9/247* (2013.01); *A01G 9/02* (2013.01)

(58) Field of Classification Search
  CPC . A01G 9/24; A01G 9/247; A01G 9/02; A01G 9/10; A01G 9/14; A01G 9/1438
  See application file for complete search history.

(56) References Cited

U.S. PATENT DOCUMENTS

| | | | | |
|---|---|---|---|---|
| 4,529,156 A | * | 7/1985 | Heuer | B05B 15/062 239/276 |
| 5,212,903 A | * | 5/1993 | Talbott | A01G 9/242 239/242 |
| 5,224,652 A | * | 7/1993 | Kessler | B05B 3/0486 239/211 |

* cited by examiner

*Primary Examiner* — Monica Williams
*Assistant Examiner* — Aaron Rodziwicz
(74) *Attorney, Agent, or Firm* — Stevenson IP, LLC

(57) ABSTRACT

An indoor-outdoor garden unit including a basin having an overhead canopy, connected to a water source via a main water tube and holding a plurality of opaque growing trays with removable opaque lids for optimal sprout growth in the dark. The main water supply tube operationally communicates with an on-off timer controlling water cycles. Bottom holes in each growing tray allow water, infused into the basin by any of three selectable mechanisms, to flow upwardly to water the sprouts from underneath, and serve to drain water from the growing trays and to aerate the plants between watering cycles. Sprayers on the underside of each growing tray lid allow watering from the top side. Water can be infused into the basin by the direct basin fill inlet or by a water fountain from which water impacts a water catcher member undermounted on the canopy to shed droplets into the basin.

9 Claims, 11 Drawing Sheets

INDOOR-OUTDOOR GARDEN UNIT

BACKGROUND OF THE INVENTION

Various types of garden units are in use and are known in the prior art. However, most garden units that can be mounted must be hand-watered and only provide or limit their installation for plants that need light. The present apparatus provides areas in which seeds or sprouts can be grown in total darkness, as needed. The present device also permits the growing of certain types of sprouts that need light for their final growth stage, as needed. The present device also permits growing other plant types besides sprouts, plants which need light for their normal growth stages. In addition, every feature of the present device can be utilized indoors as well as outdoors. Further, the present indoor-outdoor garden unit is devised to water sprouts or plants from the underside by the selection of any of three methods as well as from the top side by the selection of any of three methods. The present device also provides for a built-in three-way irrigation system designed to facilitate the growing of various plant and sprout types simultaneously regardless of whether they need light for their normal growth stages or not, as well as for their regular watering. The irrigation system can be manually and alternately automatically controlled with adjustably timed cycles.

FIELD OF THE INVENTION

The present invention relates to garden units and, more particularly, to an indoor-outdoor garden unit which incorporates a manually controllable as well as an automatically controllable irrigation system which delivers water through three separate delivery means which can be used singly or in simultaneous combination to actively supply water to plants and sprouts. The quantity of water to be delivered through each delivery means simultaneously can be varied or manually adjusted during or between watering events.

SUMMARY OF THE INVENTION

The indoor-outdoor garden unit includes a basin and an overhead canopy attached thereto by vertical posts. A plurality of growing trays, each having a removable lid, is disposed on a floor of the basin. The growing trays are lockable onto the floor. The trays and the lids are opaque to block out all light. Each growing tray has a plurality of apertures in a bottom side thereof to allow water within the basin to flow upwardly through the apertures to reach the seeds inside the growing trays. The main water supply tube has one end operationally connected to a water source, which can be an indoor or an outdoor source of water, and has an opposite end operationally connected to a two-way valve of the indoor-outdoor garden unit. The two-way valve is in operational communication with the main water supply tube, an on-off timer, a basin drain outlet, a drain tube, and a main water channel of the indoor-outdoor garden unit. The main water channel in turn is in operational communication with a first manual variable valve, a fountain water channel, a second manual variable valve, a direct basin fill inlet, and a plurality of secondary water lines that each water a particular growing tray with an attached sprayer. The central fountain tube, which receives water from the fountain water channel, helps to disperse water by directing a stream of water upwardly toward the canopy. Mounted to a ceiling of the canopy is a water catcher member. At an upper mounting point of the water catcher are escape holes. The central fountain tube's upward stream of water impacts the water catcher which funnels the water upwardly and through the escape holes. Water passing through the escape holes will cohesively cling to the ceiling of the canopy which, because the ceiling is sloped, allows this water to cling and spread out and then fall as droplets down into the basin. Any droplets which might land on the growing tray lids will run off the sloped lids and into the basin. When a growing tray lid is not in use, droplets of water disperse directly onto plants and sprouts growing in the respective growing tray. The present device also includes a fountain head attachment to be attached to the top of the central fountain tube as an alternate means to disperse water. The direct basin fill inlet supplies water directly into the basin. As the basin is infused with water by the selection of either the direct basin fill inlet, the fountain head attachment, or from the canopy's ceiling by way of the water fountain, water will then flow underneath the growing trays and flow upwardly through the apertures in the bottom sides of the growing trays to water the plants and sprouts.

Additionally, sprayers, which can also be mister nozzles, are mounted to the underside of the lids. Water supply tubes, one for each sprayer, attach to a top side of each lid to supply water through openings in the respective lid top sides to the respective sprayers mounted therebeneath. The basin also has overflow and drainage capabilities. The present device also includes a fly net. A pressure plate is attachable around the central fountain tube underneath the central lid above the central growing tray. The pressure plate serves to assist in the growing of bean sprouts.

Thus has been broadly outlined the more important features of the present indoor-outdoor garden unit so that the detailed description thereof that follows may be better understood and in order that the present contribution to the art may be better appreciated.

DETAILED DESCRIPTION OF THE DRAWINGS

Figure 1:
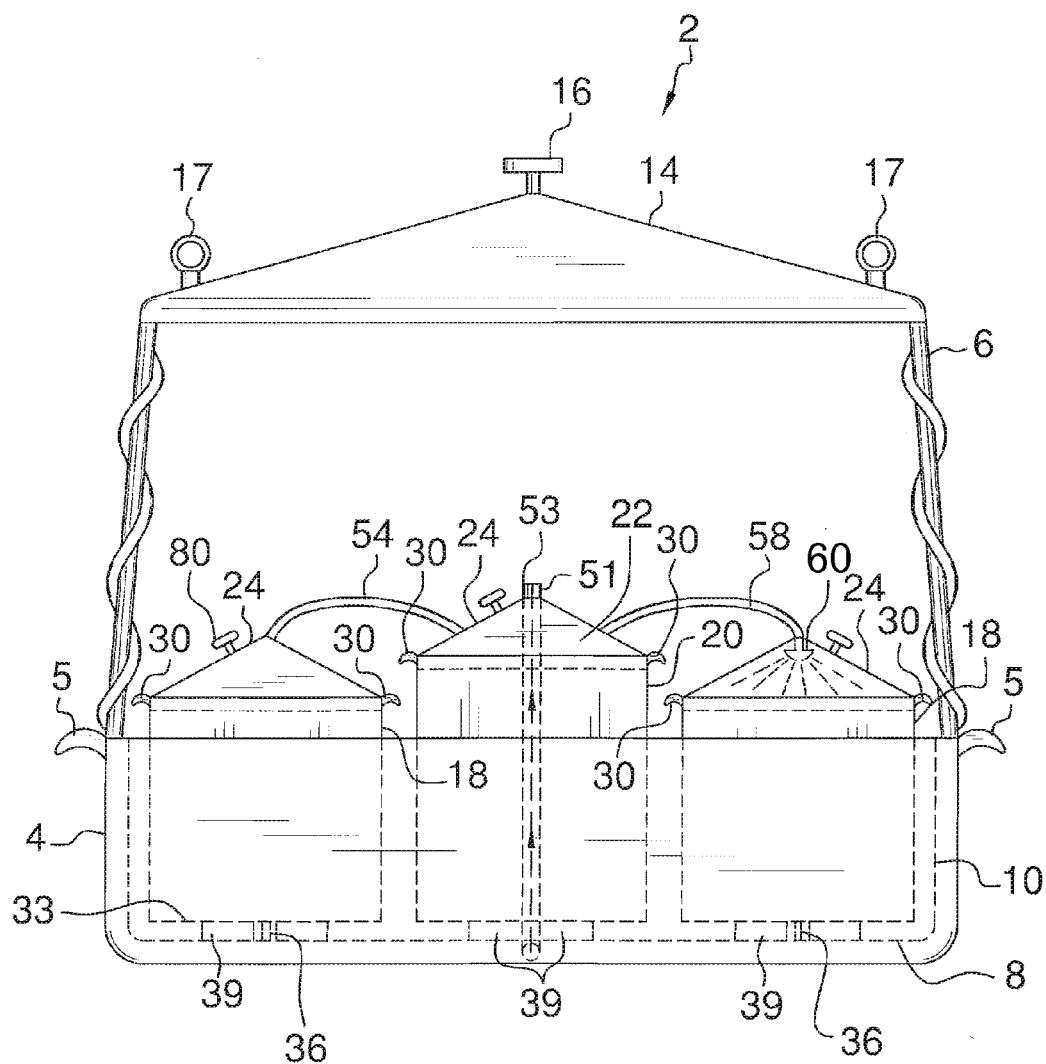
FIG. 1 is a front elevation view.
Figure 2:
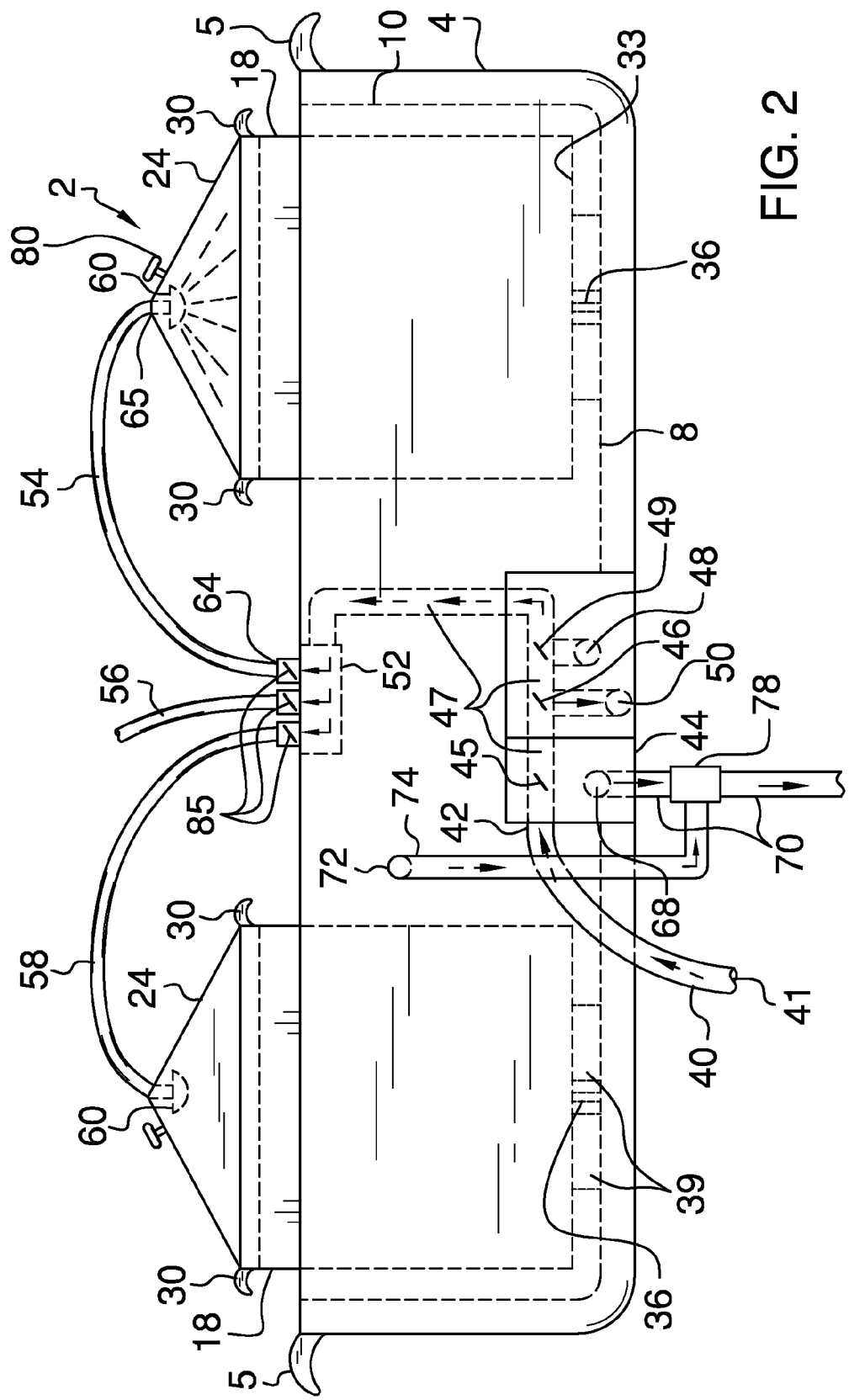
FIG. 2 is a rear elevation view.
Figure 3:
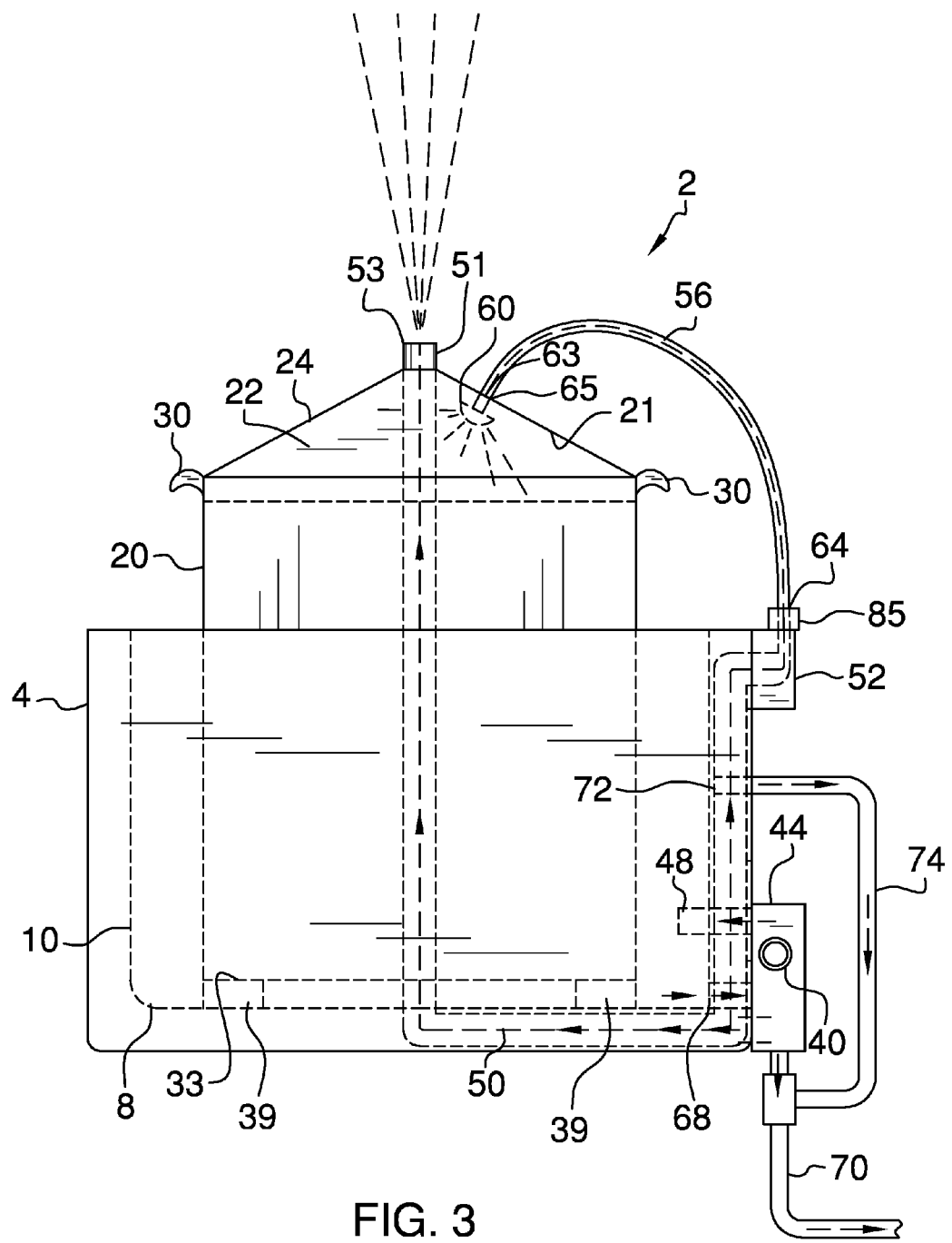
FIG. 3 is a side elevation view
Figure 4:
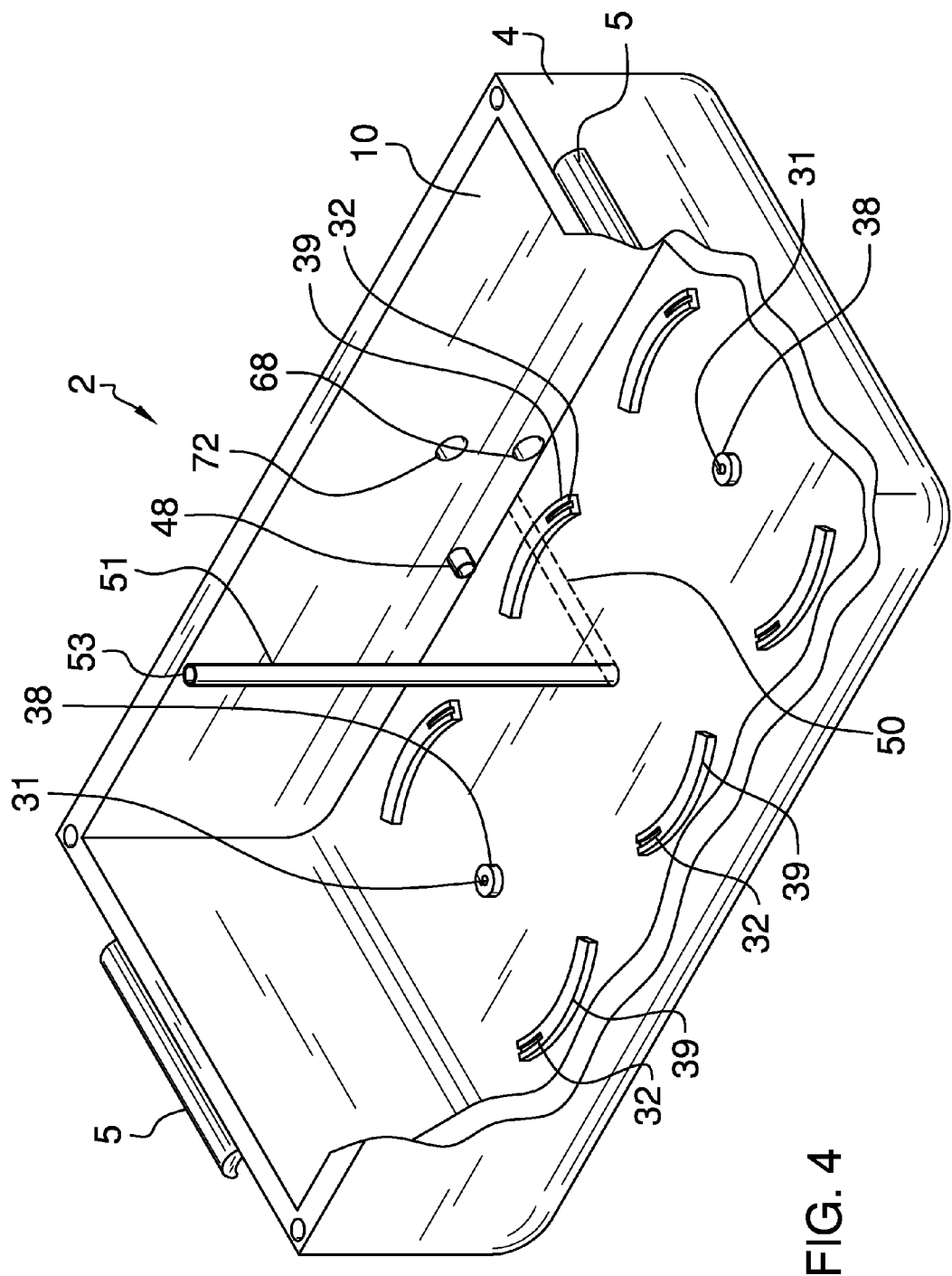
FIG. 4 is an isometric view of a basin.
Figure 5:
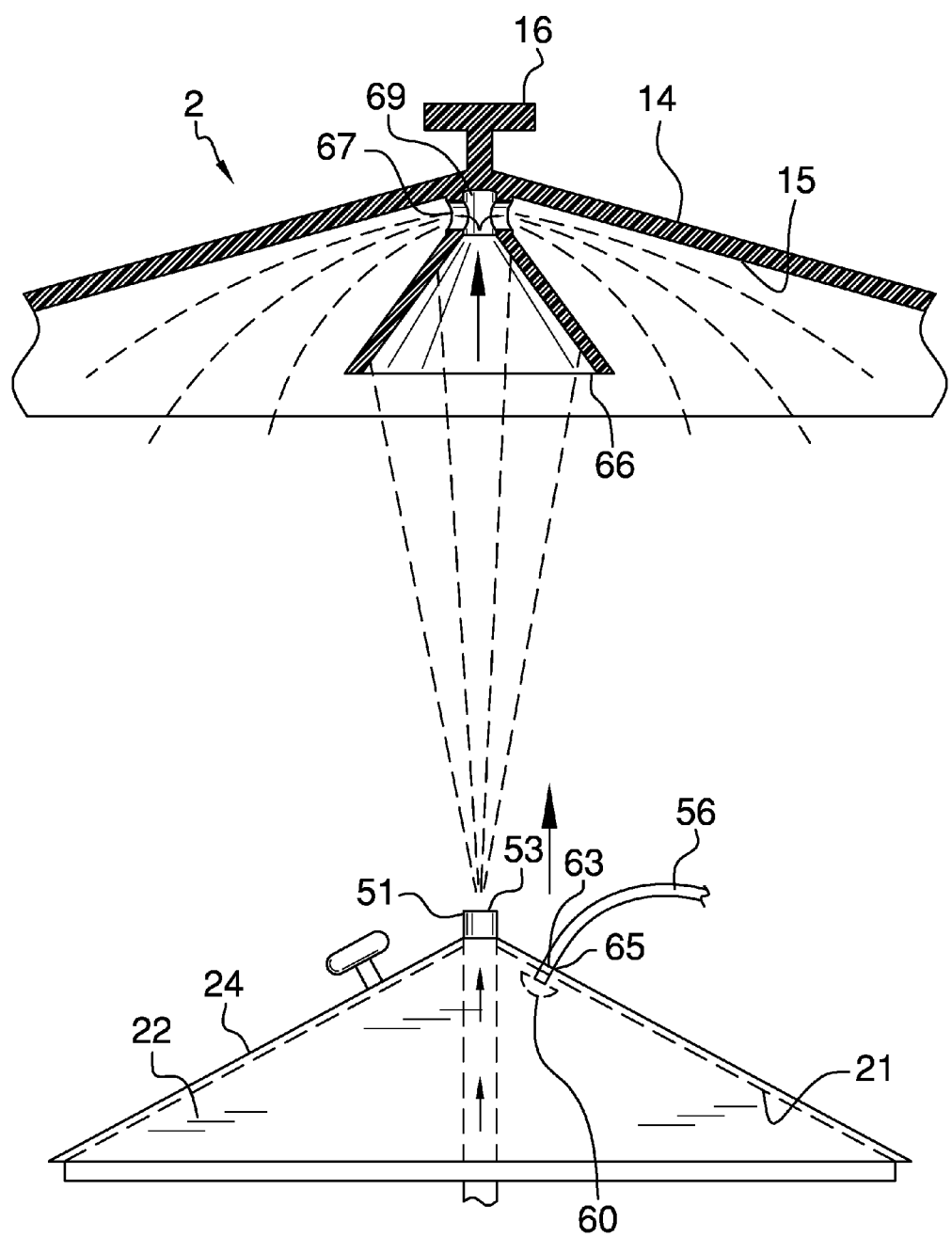
FIG. 5 is a front elevation view of the central tray lid and a canopy with a partial cutaway view of an interior side thereof and showing a flow of water from a central fountain tube into a water catcher member centrally disposed on the interior side and through a plurality of openings on an upper end of the water catcher member.
Figure 6:
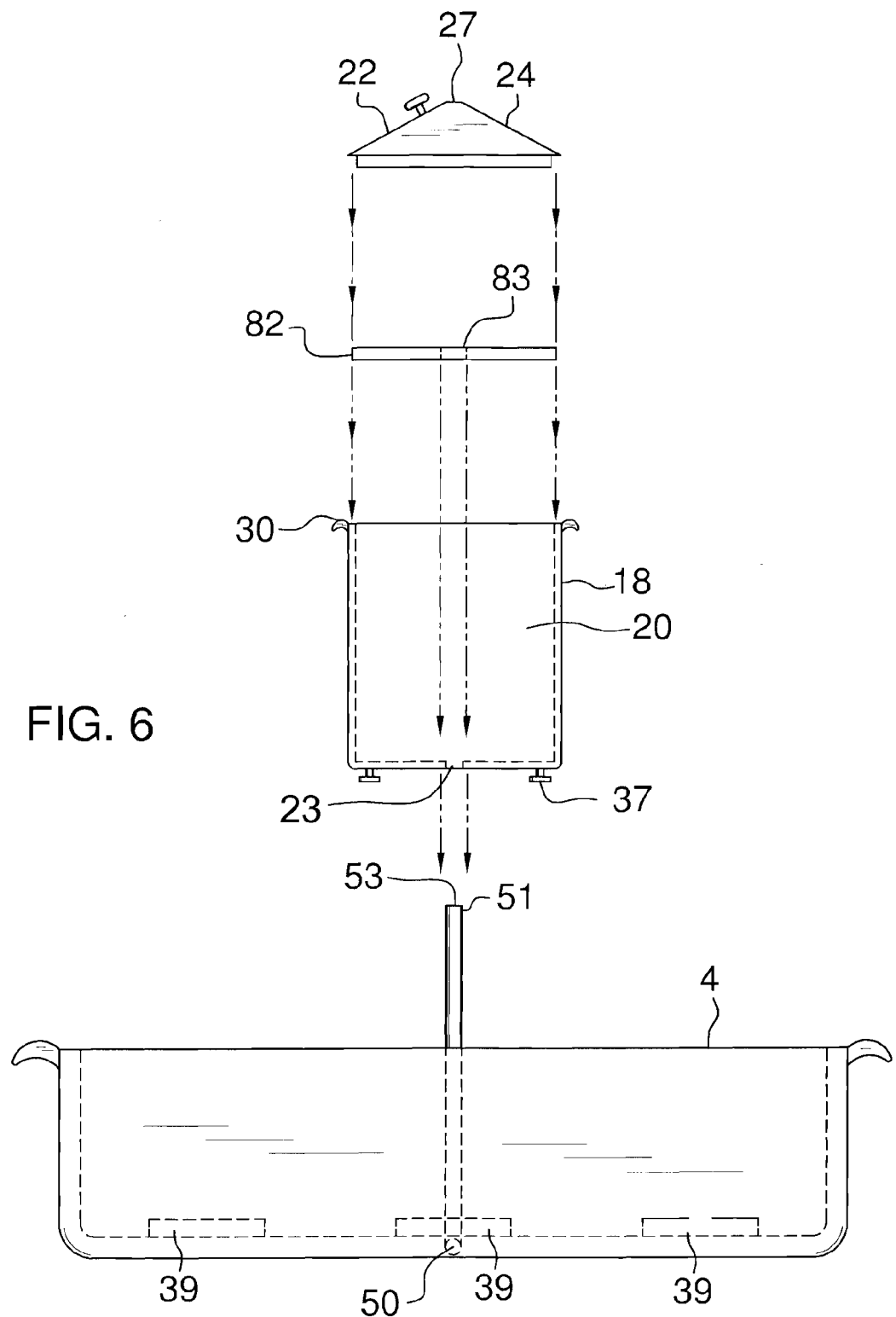
FIG. 6 is an exploded front elevation view with a partial cutaway view showing the attachability of a pressure plate, growing tray lid and a central growing tray of a plurality of growing trays around the central fountain tube.
Figure 7:
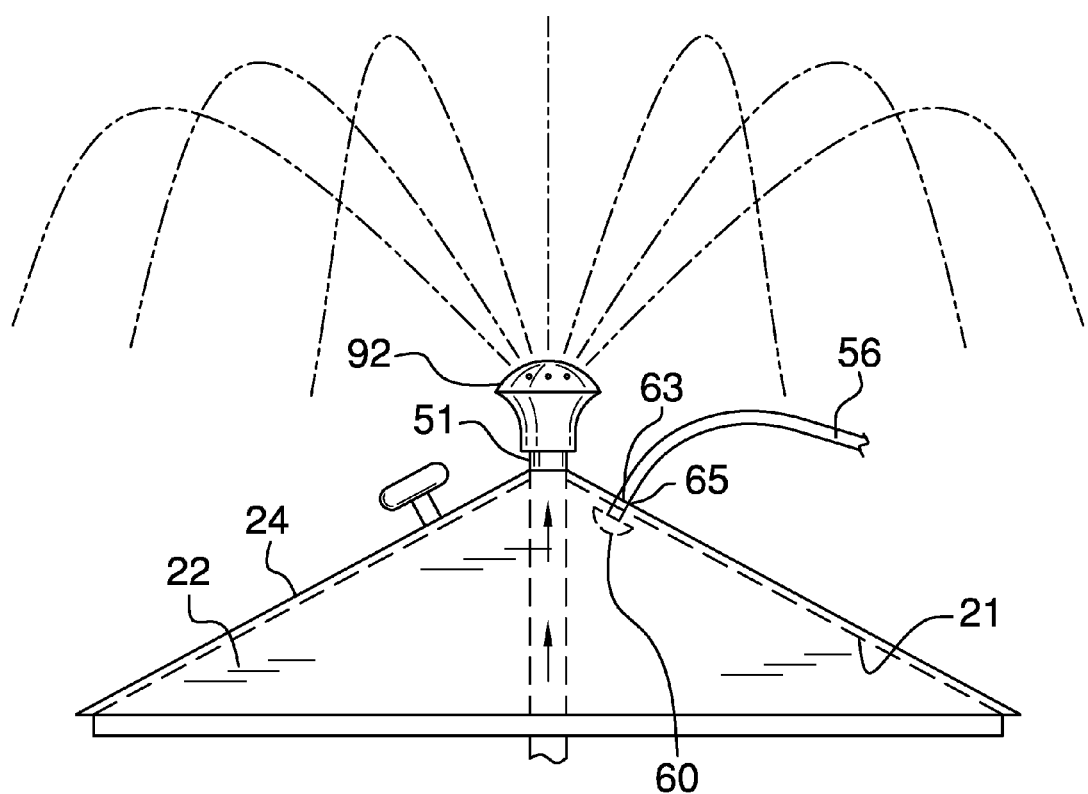
FIG. 7 is a front elevation view showing the flow of water through the central fountain tube and a fountain head attachment and with a central lid.
Figure 8:
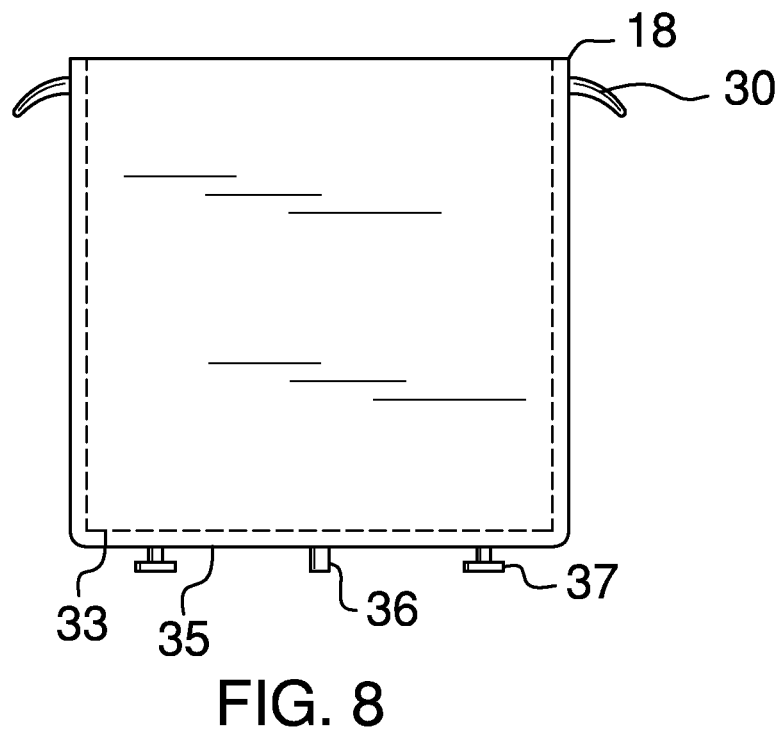
FIG. 8 is a side elevation view of an outer one of the plurality of growing trays.
Figure 9:
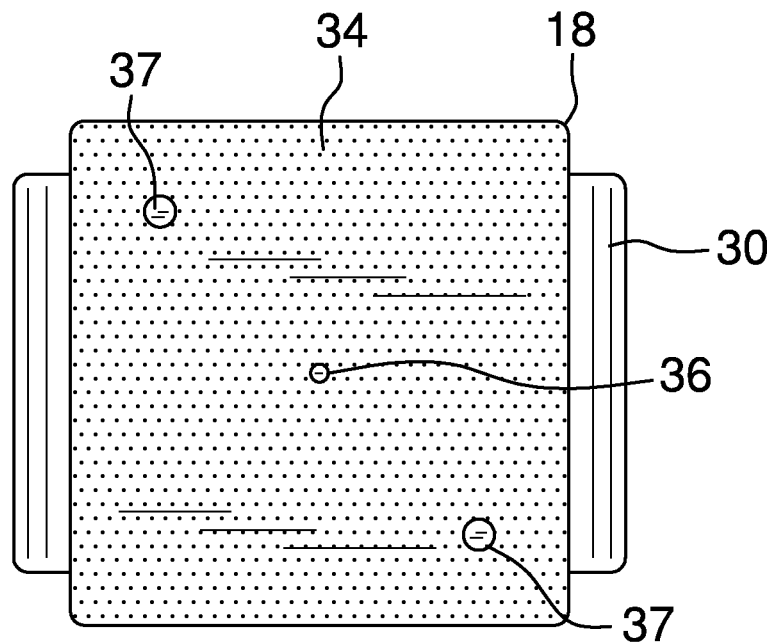
FIG. 9 is a bottom plan view of the outer one of the plurality of growing trays.
Figure 10:
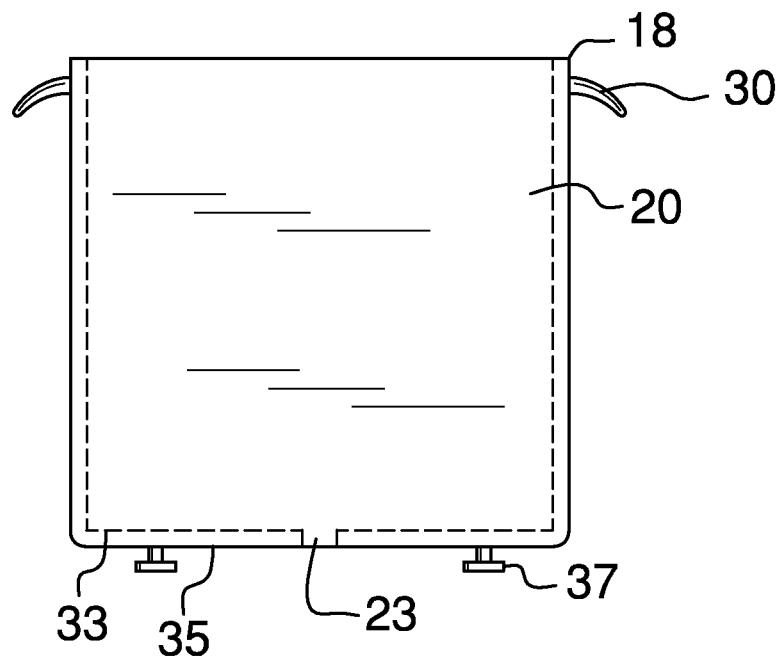
FIG. 10 is a side elevation view of the central growing tray.
Figure 11:
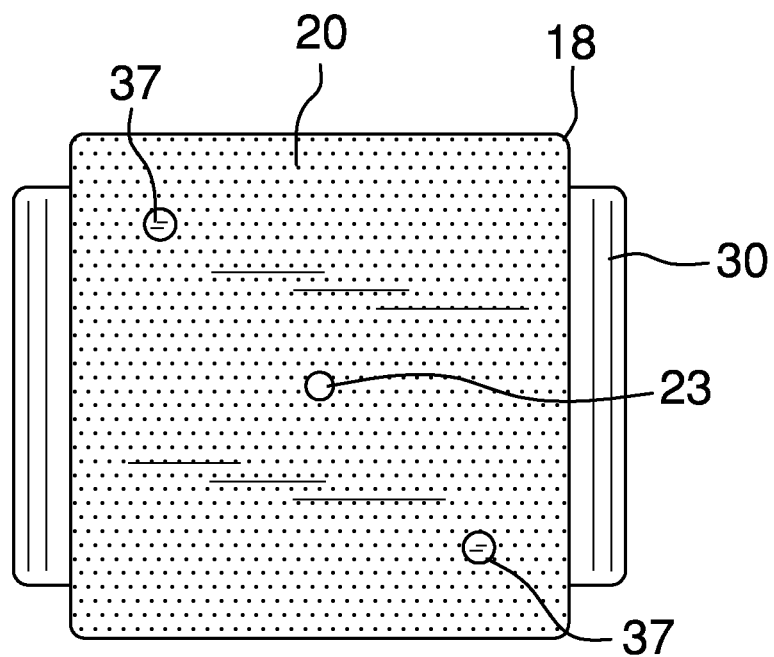
FIG. 11 is a bottom plan view of the central growing tray.
Figure 12:
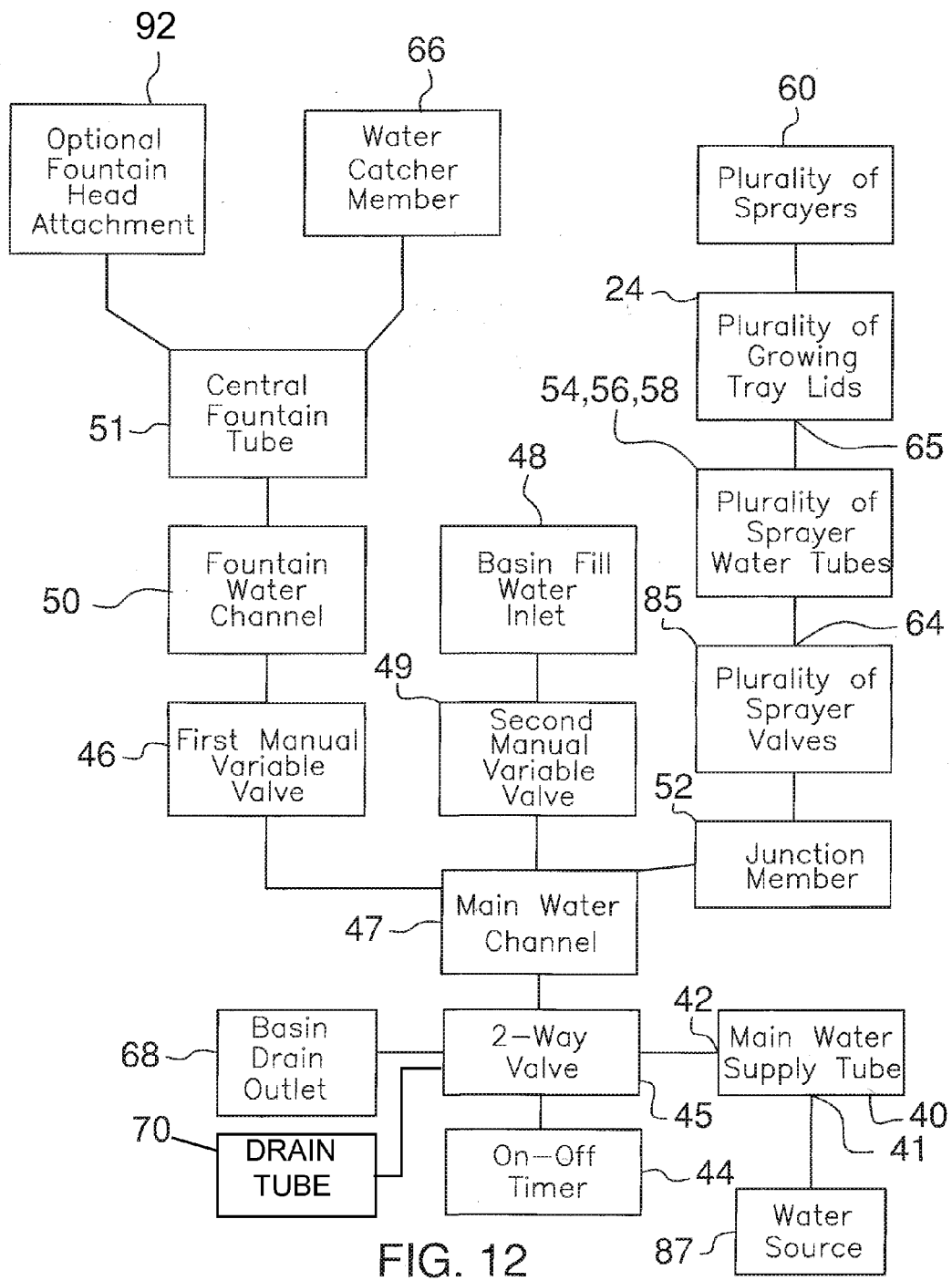
FIG. 12 is a block diagram of operations.
Figure 13:
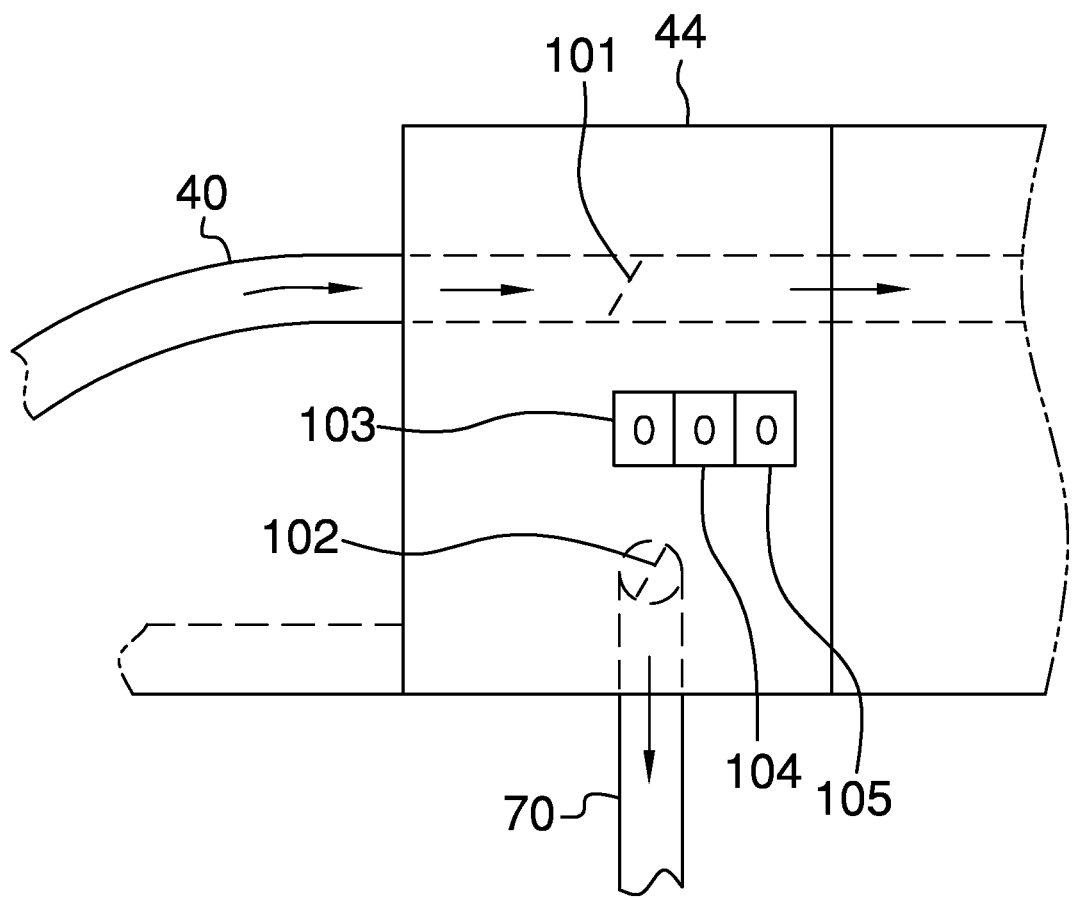
FIG. 13 is a detailed rear elevation view of an on-off timer showing a fresh water valve and basin drain valve substituted for a two-way valve and, further, a manual on-off control, a first user timer control and a second user timer control on the on-off timer.

With reference now to the drawings, and in particular FIGS. 1 through 13, thereof, an example of the indoor-outdoor garden unit employing the principles and concepts of the present invention and generally designated by the reference number 2 will be described.

Referring to FIGS. 1 through 13, the indoor-outdoor garden unit 2, includes a basin 4. The basin 4 has a pair of basin handles 5, a plurality of vertical posts 6, which can be disposed on corners of the basin 4 when the basin 4 is rectangular, and a lower wall 8. A canopy 14, which is centered atop the basin 4, is supported in an elevated position by the posts 6. The canopy 14 has a sloped ceiling 15 configured to align about one half inch inside an internal perimeter 10 of the basin 4 so that all water clinging to the sloped ceiling 15 of the canopy 14 will drip inside the basin 4. The canopy 14 has a top-mounted canopy handle 16 thereon for easy grasping and a plurality of hanging loops 17.

A plurality of growing trays 18, provided for sprouting seeds or growing plants, is disposed within the basin 4. Each growing tray 18 has a pair of handles 30 for easy removal thereof from out of the basin 4. Each of the growing trays 18 has a respective removable sloped tray lid 24, each of which has an underside 21. The growing trays 18 and the tray lids 24 are opaque to prevent light from entering therein because many types of sprouts grow best in the dark. Each tray lid 24 has a lid handle 80 thereon for easy removal thereof from the respective growing tray. A central growing tray 20 is a central one of the plurality of growing trays 18 and has a central lid 22, which is removably attached to the central growing tray 20. The central growing tray 20 further includes a central growing tray opening 23. The central lid 22 further includes a central lid opening 27. A pressure plate 82, provided to assist in the growing of bean sprouts, is disposed within the central growing tray 20 under the central lid 22. The pressure plate 82 further includes a pressure plate opening 83. The central growing tray opening 23 and the central lid opening 27 and the pressure plate opening 83 enable a central fountain tube 51 to slide through the central growing tray opening 23, the central lid opening 27, and the pressure plate opening 83.

Each growing tray 18 has a bottom wall 33 and a plurality of apertures 34 in the bottom wall 33. Each aperture 34 has a diameter of approximately ⅟32 inch. The apertures 34 permit water to drain from the growing trays as well as allow the upward flow of water through the growing trays as the basin 4 begins to fill with water. The apertures 34 also serve to aerate the sprouts in the growing trays 18 between water cycles. Each of an outer one of the growing trays 18 also has a growing tray protrusion 36 centrally disposed on the growing tray 18 lower side 35 of the bottom wall 33. A plurality of centering protrusions 38 is disposed on the lower wall 8 of the basin 4 and are equally spaced apart way from the central fountain tube 51. Within each centering protrusion 38 is a centering recess 31. The growing tray protrusion 36 of each of the outer one of the growing trays 18 removably engages a respective centering recess 31. The growing tray protrusion 36 and a centering recess 31, together, are configured in order to initially align the growing trays 18 for subsequent rotation and locking of growing trays 18 onto the lower wall 8 of basin 4.

A plurality of spacers 39 is disposed on the lower wall 8 of the basin 4. Each spacer 39 has an outer locking notch 32. A plurality of legs 37 is disposed on the lower side 35 of the bottom wall 33 of each growing tray 18. By rotating a growing tray 18, each leg 37 slidingly engages the outer locking notches 32 of a respective one of the spacers 39 thereby locking a growing tray 18 with the lower wall 8 of the basin 4 to prevent the growing trays 18 from floating in the basin 4 once a significant amount of water is within the basin 4. The legs 37 and the spacers 39, together, also serve to act to provide a small gap between the bottom wall 33 of each growing tray 18 and the lower wall 8 of basin 4 to allow water and air to flow underneath the growing trays 18 and to flow through the apertures 34.

Within the basin 4 is a basin drain outlet 68. The basin drain outlet 68 is disposed adjacent to the lower wall 8 of the basin 4 to facilitate thorough draining of basin 4. The basin drain outlet 68 is operationally connected to a two-way valve 45 which is also operationally connected to a drain tube 70 permitting water to drain from the basin 4.

A main water supply tube 40 is in operational communication with a water source 87 and the two-way valve 45. The main water supply tube 40 is connected at a first end 41 thereof to the water source 87 and at a second end 42 thereof to the two-way valve 45. Two-way valve 45 is also in operational communication with a main water channel 47, and two-way valve 45 is operationally connected with an on-off timer 44 which configuration will selectively receive an amount of fresh water from the main water supply tube 40 and provide the water to a main water channel 47 and to the indoor-outdoor garden unit 2 as needed. The on-off timer 44 includes a manual on-off control 103, a first user timer control 104, and a second user timer control 105. The on-off timer 44 is therefore in operational communication with the main water supply tube 40 and the two-way valve 45. The on-off timer 44 can be manually controlled to engage or terminate a water cycle or can be alternately set to automatically control the timing between water cycles and the duration of a water cycle by using the manual on-off control 103, the first user timer control 104, and a second user timer control 105.

The manual on-off control 103 is configured to initiate and terminate a water cycle. The first user timer control 104 is configured to control the number of minutes between water cycles. The second user timer control 105 is configured to control the number of duration minutes of the water cycle. Thus, the two-way valve 45 is automatically controlled and alternately manually controlled by the on-off timer 44. Two-way valve 45 has dual functionality. In addition to the function of two-way valve 45 to receive fresh water from the main water supply tube 40 and send it to the main water channel 47, two-way valve 45 may also receive used water from the basin drain outlet 68 and send it to the drain tube 70. Therefore, two-way valve 45 also is in operational communication with basin drain outlet 68 and drain tube 70. Thus two-way valve 45 can be thought of as two valves in one, since fresh water may pass through one side of two-way valve 45 and used water may pass through the other side of two-way valve 45, but water may pass only through one side at any one time, because when one side of two-way valve 45 is open the other side is closed and visa versa.

The two-way valve 45 has a first position and a second position and is operationally reversed into each position by the on-off timer 44; therefore, each time when two-way valve 45 reverses to its opposite position, one side of two-way valve 45 is moved open and the other side is moved closed or visa versa. Therefore when two-way valve 45 is in a first position, fresh water is allowed to travel from the main water supply tube 40 through one side of two-way valve 45 into the main water channel 47 to initiate a water cycle, simultaneously cutting off used water drainage through the other side of two-way valve 45 which would receive water from basin drain outlet 68. This prevents water from draining from the basin 4 during the water cycle; therefore, the basin 4 begins to fill with water when the two-way valve 45 is in the first position to feed fresh water to the indoor-outdoor garden unit 2. Inversely, when the two-way valve 45 is in a second position, this state cuts off flow of fresh water through one side of two-way valve 47 and allows draining of used water through the other side of two-way valve 45 received from basin drain outlet 68 therefore ending the water cycle. A pair of separate one-way valves can be substituted for the two-way valve 45 by including a fresh water valve 101 and a basin drain valve 102, with the operation of the pair of one-way valves to duplicate the functioning result of the two-way valve 45.

On-off timer 44 is in operational communication with the fresh water valve 101 and the basin drain valve 102. At the moment when the on-off timer 44 opens the fresh water valve 101, the on-off timer 44 closes the basin drain valve 102. Inversely, when the on-off timer 44 closes the fresh water valve 101, the on-off timer 44 opens the basin drain valve 102. When the fresh water valve 101 is open, an amount of fresh water is allowed to travel from the main water supply tube 40 into the main water channel 47, and when the fresh water valve 101 is closed, no fresh water is allowed to enter into the main water channel 47. When the basin drain valve 102 is open, used water from the basin 4 is allowed to travel from the basin drain outlet 68 into the drain tube 70, and when the basin drain valve 102 is closed, no used water is allowed to enter into the drain tube 70.

With the fresh water feed side of two-way valve 45 open, water will travel through main water channel 47 to arrive at the first manual variable valve 46. The first manual variable valve 46 is in direct operational communication with the main water channel 47 and the fountain water channel 50. The first manual variable valve 46 is manually controlled, rather than being automatically controlled, and is adjustable at two extreme positions and all positions therebetween. The first manual variable valve 46 is adjustable to select an amount of water flow from main water channel 47 into the fountain water channel 50 which, in turn, feeds water into a central fountain tube 51 centrally disposed in a vertical position through the lower wall 8 of the basin 4. The central fountain tube 51 has an open distal end 53, and sends its stream of water upwardly into a water catcher member 66 attached to the canopy 14.

As shown, the water catcher member 66 is frustoconical and has an upper mounting point 69 where the water catcher member 66 is attached to the canopy 14. The water catcher member 66 receives water and disperses the water through a plurality of escape holes 67 disposed proximal the upper mounting point 69. Thus, water streamed upwardly through the central fountain tube 51 impacts the water catcher member 66 which, in turn, funnels water upwardly and through the escape holes 67. Water passing through the escape holes 67 clings onto the sloped ceiling 15 of the canopy 14, and then is dispersed as droplets downwardly into the basin 4. Any droplets dispersed on each of the sloped lids 24 will drip into the basin 4. When a growing tray 18 lid 24 is not in use, droplets disperse directly onto plants and sprouts growing in the respective growing tray 18. As the basin 4 is infused with water, water will flow underneath the growing trays 18 and flow upwardly through the apertures 34 in the bottom walls 33 of the growing trays 18 to water the plants and sprouts. Then, the water will flow downwardly back through the apertures 34 into the basin 4 at the end of the water cycle when on-off timer 44 reverses the position of the two-way valve 45 cutting off the fresh water from main water supply tube 40 and allowing used water in the basin 4 to flow through basin drain outlet 68, draining the basin 4.

Alternately, the first manual variable valve 46 is adjustable to select an amount of water flow from the main water channel 47 to continue through the main water channel 47 and in turn, sends the water flow to the second manual variable valve 49, which is in direct operational communication with the main water channel 47 and the basin fill water inlet 48. The second manual variable valve 49 is also manually controlled, rather than being automatically controlled, and is adjustable at two extreme positions and all positions therebetween. The second manual variable valve 49 is adjustable to select an amount of water flow from the main water channel 47 and first manual variable valve 46 into a basin fill water inlet 48, and alternately to allow a selected proportion of water to continue through the main water channel 47. The basin fill water inlet 48 is disposed proximal the lower wall 8 of the basin 4. Water traveling through the basin fill water inlet 48 will, over time, infuse the basin 4 with water. Water directed through the main water channel 47 flows to a junction member 52, wherein the main water channel 47 then splits into a plurality of sprayer supply tubes 54, 56, 58 each having a variable sprayer valve 85 mounted between the junction member 52 and each of the sprayer supply tubes 54, 56, 58. Therefore, each variable sprayer valve 85 is in operational communication with the respective sprayer supply tube 54, 56, 58, junction member 52 and the main water channel 47.

Each of the plurality of sprayer supply tubes 54, 56, 58 connects at a first end 64 to one of the variable sprayer valves 85 and connects at a second end 65 to a respective tray lid 24 at the point of the sprayer opening 63 to allow water to flow from a sprayer water supply tube 54, 56, 58 through a respective sprayer opening 63 to a sprayer 60 mounted below. Each of the variable sprayer valves 85 is adjustable at two extreme positions and all positions therebetween. Each of the variable sprayer valves 85 is adjustable to either cut off water flow through the respective sprayer supply tube 54, 56, 58 or to allow a selected proportion of water to flow through the respective sprayer supply tubes 54, 56, 58. Each growing tray lid 24 has an opening 63 to allow water to pass through the growing tray lid 24 to a sprayer 60 mounted on the tray lid 24 underside 21 at the point of the sprayer opening 63. To accommodate different types of plants and sprouts, the sprayers 60 are manually adjustable to permit dispersal in a range of a course spray to a fine mist. An assortment of sprayers, which are fixed in their spray size rather than being adjustable, may be substituted for adjustable sprayers. The assortment of sprayers includes individual sprayers, each of which disperses a different droplet size.

Overflow outlet 72 is disposed within the basin 4 at a higher level than the basin drain outlet 68 and is attached to the overflow exit tube 74. The overflow outlet 72 and the overflow exit tube 74 prevent basin 4 from overflowing when excessive water enters the basin 4. Each of the drain tube 70 and overflow exit tube 74 extend to and attach to a same joint 78 with the drain tube 70 extending below the joint 78 to permit drain tube 70 to be routed to a sink, pail, or other plants located proximal the indoor-outdoor garden unit 2.

The basin 4 has a preferable length in a range of approximately 30 inches to 32 inches, a preferable width of approximately 12 inches, and a preferable height in a range of approximately 3 inches to 4.

The present indoor-outdoor garden unit 2 also includes a fountain head attachment 92, which is in operational communication with the central fountain tube 51. The present device indoor-outdoor garden unit 2 also includes a fly net to be wrapped around the garden unit 2 when needed, and a pressure plate 82. The pressure plate 82 is attachable around the central fountain tube 51 underneath the central lid 22 above the central growing tray 20 and serves to assist in the growing of bean sprouts.

What is claimed is:

1. An indoor-outdoor garden unit comprising:
   a basin having a basin lower wall;
   a pair of basin handles attached to the basin;
   a canopy attached to a plurality of vertical posts, the canopy centrally disposed atop the basin, the canopy having a sloped ceiling configured to align inside an internal perimeter of the basin;
   the plurality of vertical posts attached to the basin and the canopy;
   wherein a length of the canopy is less than a length of the basin;
   wherein a width of the canopy is less than a width of the basin;
   a canopy handle disposed atop the canopy;
   a plurality of hanging loops attached to the canopy;
   a plurality of growing trays disposed within the basin, each of the plurality of growing trays having a pair of handles, a bottom wall and a plurality of apertures disposed in the bottom wall, the plurality of growing trays including a central growing tray, wherein the central growing tray has a central growing tray opening in the bottom wall;
   a plurality of removable sloped lids, each of the plurality of sloped lids having a lid handle, each of the plurality of sloped lids disposed atop each of the plurality of growing trays, the central growing tray having a central lid, wherein the central lid has a central lid opening;
   a main water supply tube having a first end and a second end, the first end connected to a water source, the second end connected to a two-way valve, the two-way valve in operational communication with the main water supply tube;
   an on-off timer in operational communication with the two-way valve, the on-off timer comprising a manual on-off control, a first user timer control, and a second user timer control, wherein the manual on-off control is configured to initiate and terminate a water cycle, wherein the first user timer control is configured to control the number of minutes between water cycles, and wherein the second user timer control is configured to control the number of duration minutes of the water cycle;
   the two-way valve in operational communication with the on-off timer, the main water supply tube, a main water channel, a basin drain outlet and a basin drain tube;
   wherein the two-way valve has a first position and an alternate second position;
   wherein the on-off timer is configured to operationally shift the two-way valve into the first position at the conclusion of the minutes set in the first user timer control of the on-off timer;
   wherein the on-off timer is configured to operationally shift the two-way valve into the second position at the conclusion of the minutes set in the second user timer control of the on-off timer;
   wherein the two-way valve is configured to allow an amount of fresh water to travel from the main water supply tube and direct the fresh water to the main water channel and to prevent the flow of an amount of used water from the basin drain outlet in the first position;
   wherein the two-way valve is configured to prevent the flow of fresh water from the main water supply tube and at the same time to allow the flow of used water from the basin drain outlet, and direct the used water into the drain tube in the second position;
   the main water channel having a first end and a second end, the first end connected to the two-way valve, the second end connected to a junction member, the main water channel in operational communication with the two-way valve, a first manual variable valve, a second manual variable valve and the junction member;
   a central fountain tube centrally disposed in a vertical position through the lower wall of the basin, the central fountain tube having an open distal end;
   wherein the central fountain tube slidingly engages the central growing tray opening, the central lid opening and a pressure plate opening;
   a pressure plate disposed around the central fountain tube underneath the central lid and above the central growing tray, wherein the pressure plate has the pressure plate opening;
   a frustoconical water catcher member attached to the canopy at an upper mounting point and in fluid communication with the central fountain tube;
   wherein the water catcher member is in fluid communication with a plurality of escape holes disposed proximal the upper mounting point of the water catcher member;
   wherein the central fountain tube is configured to send a stream of water upwardly into the water catcher member attached to the canopy;
   wherein the water catcher member is configured to receive water and disperse water through the plurality of escape holes;
   wherein the canopy is configured with the sloped ceiling at an angle to allow water which passes through the escape holes to cling to the sloped ceiling and spread out and fall as droplets;
   a basin fill water inlet disposed proximal the lower wall of the basin;
   the first manual variable valve in operational communication with the main water channel and the fountain water channel;
   a fountain water channel in fluid communication with the first manual variable valve and the central fountain tube;
   the second manual variable valve in operational communication with the main water channel and the basin fill water inlet, each of the first manual variable valve and the second manual variable valve having a first position and an alternate second position and alternately being manually adjustable to select any position between the first and second positions;
   wherein the second manual variable valve is configured to direct water from the first manual variable valve and the main water channel into the basin fill water inlet in the first position;
   wherein the second manual variable valve is configured to direct water to continue through the main water channel to the junction member in the second position;

wherein the second manual variable valve is configured to be manually adjustable to select an amount of water flow into both the main water channel and the basin fill water inlet simultaneously;

wherein the first manual variable valve is configured to direct water from the two-way valve and the main water channel into the fountain water channel in the first position;

wherein the first manual variable valve is configured to direct water to continue through the main water channel to the second manual variable valve in the second position;

wherein the first manual variable valve is configured to be manually adjustable to select an amount of water flow into both the main water channel and the fountain water channel simultaneously, the fountain water channel configured to feed water into the central fountain tube;

the junction member in operational communication with the main water channel and a plurality of variable sprayer valves;

a plurality of variable sprayer valves in operational communication with the junction member and a plurality of sprayer supply tubes;

wherein each of the variable sprayer valves is configured to be manually adjustable to cut off water flow through the respective sprayer supply tube and alternately to allow a selected proportion of water to flow through the respective sprayer supply tube;

the plurality of sprayer supply tubes, each sprayer supply tube having a first end and a second end, the first end connected to one of the plurality of growing tray lids at the point of a sprayer opening, the second end connected to one of the plurality of variable sprayer valves, wherein the sprayer supply tube is in operational communication with the variable sprayer valve, the growing tray lids and a plurality of sprayers;

the plurality of sprayers, wherein one of each of the plurality of sprayers attaches to one of the tray lid undersides at the point of the sprayer opening, each of the plurality of sprayers in fluid communication with the sprayer supply tube, each of the plurality of sprayers configured to be manually adjustable to disperse a fine and alternately a coarse mist;

the basin drain outlet disposed adjacent to the lower wall within the basin;

the drain tube attached to the two-way valve, the drain tube configured to drain water from the basin drain outlet through the two-way valve;

an overflow outlet disposed above the drain outlet within the basin, wherein the overflow outlet is configured to prevent the basin to overflow with water;

an overflow exit tube attached to the overflow outlet on one end and to a joint on an opposite end; and wherein the joint is attached to both the drain tube and the overflow exit tube, the joint configured to combine used water from both the drain tube and the overflow exit tube, the drain tube configured to then extend below the joint to permit the drain tube to be routed to one of a sink, a pail, and alternately to other plants proximal the growing trays.

2. The indoor-outdoor garden unit of claim 1 further comprising:

a growing tray protrusion on each of an outer one of the plurality of growing trays, the growing tray protrusion centrally disposed on an lower side of the growing tray bottom wall;

a plurality of centering protrusions on the lower wall of the basin, each of the plurality of centering protrusions equally spaced apart away from a center of the lower wall of the basin;

a centering recess centrally disposed within each centering protrusion;

wherein the growing tray protrusion is configured to removably engage a respective centering recess;

a plurality of spacers disposed on the lower wall of the basin, each of the plurality of spacers having an outer locking notch; and a plurality of legs, each of the plurality of legs disposed on the bottom wall of each of the plurality of growing trays;

wherein each leg of the plurality of legs slidingly engages the outer locking notch of a respective one of the spacers when the respective growing tray is rotated into place.

3. The indoor-outdoor garden unit according to claim 2 wherein the basin has a length between 30 to 32 inches, a width of approximately 12 inches, and a height of between 3 to 4 inches.

4. The indoor-outdoor garden unit of claim 1 further comprising a fountain head attachment attachable to the top of the central fountain tube and in fluid communication with the central fountain tube.

5. The indoor-outdoor garden unit of claim 1 wherein the canopy sloped ceiling aligns approximately ½ inch inside the internal perimeter of the basin.

6. The indoor-outdoor garden unit of claim 1 wherein each aperture has a diameter of approximately 1/32 inch.

7. The indoor-outdoor garden unit accordingly to claim 1 wherein the growing trays and the lids are opaque.

8. The indoor-outdoor garden unit of claim 1 further comprising a fly net, wherein the fly net is configured to be selectively wrapped around the indoor-outdoor garden unit.

9. The indoor-outdoor garden unit of claim 1 further comprising:

a fresh water valve and a basin drain valve configured to replace the two-way valve;

wherein the second end of the main water supply tube is connected to the fresh water valve and the first end of the main water supply tube is connected to a water source;

wherein the on-off timer is in operational communication with the fresh water valve and the basin drain valve, the on-off timer configured to automatically control and alternately manually control both the fresh water valve and the basin drain valve;

wherein the fresh water valve is in operational communication with the main water supply tube and the main water channel;

wherein the basin drain valve is in operational communication with the base drain outlet and the basin drain tube;

wherein the fresh water valve has an open position and an alternate closed position and the basin drain valve has an open position and alternate close position;

wherein the on-off timer is configured to operationally shift the fresh water valve into the open position and operationally shift the basin drain valve into the closed position at the conclusion of the minutes set in the first user timer control of the on-off timer;

wherein the on-off timer is configured to operationally shift the fresh water valve into the closed position and operationally shift the basin drain valve into the open position at the conclusion of the minutes set in the second user timer control of the on-off timer;

wherein when the fresh water valve is in the open position, the fresh water is allowed to travel from the main water supply tube and direct the fresh water to the main water channel and when the fresh water valve is in the closed position, to prevent fresh water to travel from the main water supply tube into the main water channel;

wherein when the basin drain valve is in the open position, used water is allowed to travel from the basin drain outlet and direct the used water to the drain tube and when the basin drain valve is in the closed position, to prevent used water to travel from the basin drain outlet into the drain tube.

* * * * *